United States Patent [19]
Cooper

[11] Patent Number: 5,906,408
[45] Date of Patent: May 25, 1999

[54] CONVERTIBLE PICKUP TRUCK

[76] Inventor: Herbert Cooper, 1965 S. Ocean Dr. No. 9-R, Hallandale, Fla. 33009

[21] Appl. No.: 08/926,706

[22] Filed: Sep. 10, 1997

[51] Int. Cl.⁶ .................................................... B60J 7/12
[52] U.S. Cl. ................ 296/114; 296/107.11; 296/216.01
[58] Field of Search ............................ 296/183, 190.01, 296/190.04, 190.08, 107.01, 114, 107.09, 107.11, 216.01, 107.16, 107.17

[56] References Cited

U.S. PATENT DOCUMENTS

| | | | |
|---|---|---|---|
| 4,238,876 | 12/1980 | Monroe et al. | 296/216.01 X |
| 4,595,230 | 6/1986 | Fettes | 296/102 |
| 4,679,847 | 7/1987 | Dirck | 296/218 |
| 4,750,778 | 6/1988 | Hoban | 296/107.17 X |
| 4,805,956 | 2/1989 | Saunders | 296/107.17 |
| 4,930,836 | 6/1990 | Grinn | 296/183 X |
| 5,056,857 | 10/1991 | Ney et al. | 296/216.01 X |
| 5,098,148 | 3/1992 | Hoban | 296/107.17 X |
| 5,673,959 | 10/1997 | Padlo | 296/114 X |

*Primary Examiner*—Joseph D. Pape
*Attorney, Agent, or Firm*—Herbert L. Lerner; Laurence A. Greenberg

[57] ABSTRACT

A convertible pickup truck which has a rear extended cab area and a windshield assembly. The convertible pickup truck has a roof structure which pivots about a framework or a safety bar. In the lowered position, the roof structures resides within the confines of the area defined by the rear extended cab of the pickup truck.

14 Claims, 12 Drawing Sheets

CONVERTIBLE PICKUP TRUCK

BACKGROUND OF THE INVENTION

1. Field of the Invention

The invention relates, generally, to a convertible pickup truck, more specifically, it relates to a convertible top which can be lowered into the confines of the cab of the pickup truck.

2. Description of the Related Art

Convertible tops have long been popular on automobiles. However, the incorporation of a convertible top into the cab of a pickup truck is believed never to have been accomplished.

Attempts to incorporate car-like convertible tops have been utilized on trucks. The convertible tops have functioned satisfactorily but need to be stored above the exterior of the bed of the truck. Of course, this limits the functionality of the truck's bed.

In general, cars do not have a convertible top storage facility problem. A car's convertible top reclines directly back into the confines behind the back seat and into the trunk area.

A pickup truck is unlike an automobile, in that the truck's cab is a separate, structural compartment from the body. In contrast, an automobile's passenger area is part of the automobile's body. When removing the roof of an extended cab pickup truck, one is removing approximately 40% of the total structural integrity of the truck as the cage effect no longer exits. Therefore, the total structure has to be redesigned to compensate for the loss in the structural integrity. For this reason, a properly built convertible pickup truck has yet to be built. Furthermore and more importantly, no convertible pickup truck has been configured in such a way that the convertible top is received within the confines of the cab area.

SUMMARY OF THE INVENTION

It is accordingly an object of the invention to provide a convertible pickup truck, which overcomes the hereinmentioned disadvantages of the heretofore-known devices and methods of this general type, and which provides a convertible top which enters into the confines of the cab of an extended cab pickup truck.

A unique feature of the invention of the instant application is the ability of the convertible top's framework to reside within the confines of the space provided in an extended-cab pickup truck when the top is in the lowered position The prior art inventions never incorporated the convertible top framework inside the cab area.

With the foregoing and other objects in view there is provided, in accordance with the invention, a convertible pickup truck, comprising a pickup truck having an extended cab area; and a roof structure residing within the rear extended cab area in a lowered position of the roof structure.

With the foregoing and other objects in view there is also provided, in accordance with the invention, a combination of a roofless pickup truck having a rear extended cab area and a windshield assembly, with a convertible top, comprising a safety bar secured to the truck; a fastener; a framework secured to the safety bar by the fastener for pivoting around the fastener between a raised and a lowered position; and a cover secured to the framework is fastened to the windshield assembly in the raised position of the framework and residing within the rear extended cab area in the lowered position of the framework.

In accordance with an added feature of the invention, the framework includes a brace fastened by the fastener, a front bow and a rear bow connected to the brace.

In accordance with another feature of the invention, the safety bar includes a set of seat belts.

In accordance with an additional feature of the invention, the safety bar includes a dome light.

In accordance with an added feature of the invention, there is a U-shaped piece disposed in the rear extended cab area.

In accordance with yet another feature of the invention, the cover is fastened to the front bow and the rear bow.

In accordance with yet an additional feature of the invention, the windshield assembly has a female connecting strip, and the cover has a male connecting strip for engaging the female connecting strip.

In accordance with yet another added feature of the invention, the windshield assembly has a set of snaps, and the cover has a set of straps for engaging the set of snaps.

In accordance with yet another feature of the invention, the cover has a plurality of snaps for securing the cover to the U-shaped piece.

In accordance with yet another additional feature of the invention, the cover has a window disposed therein.

In accordance with an added feature of the invention, the safety bar is connected to the frame of the truck for providing structural integrity to the truck.

In accordance with another feature of the invention, the fastener is a pin with a spring.

In accordance with an additional feature of the invention, the cover is made from a material selected from the group consisting of canvas, plastic, rubber and leather.

In accordance with yet another added feature of the invention, the safety bar is connected to the side walls of the truck for providing structural integrity to the truck.

In accordance with a concomitant feature of the invention, there is a latch connected to the cover for engaging the windshield assembly.

With the foregoing and other objects in view there is also provided, in accordance with the invention, a combination of a roofless pickup truck having a rear extended cab area, a side wall and a windshield assembly, with a convertible top, comprising a fastener; a framework secured to the side wall of the pickup truck by the fastener for pivoting around the fastener between a raised and a lowered position; and a cover secured to the framework is fastened to the windshield assembly in the raised position of the framework and residing within the rear extended cab area in the lowered position of the framework.

With the foregoing and other objects in view there is further provided, in accordance with the invention, a combination of a pickup truck having a rear extended cab area and a windshield assembly, with a roof structure, comprising: a hinged, two-piece safety bar secured to the truck; a roof structure formed from the exiting pickup truck's roof; the roof structure has a front piece secured to a windshield and a detachable rear piece secured to the hinged safety bar; latching devices secured to the rear roof piece; a rear cover having a window secured to the safety bar; latch receiving devices secured to the front roof piece for engaging the latching devices, and the rear roof piece can be pivoted about the hinge of the safety bar for raising and lowering the rear roof piece and the rear roof piece resides within the confines of the rear extended cab area in a lowered position.

Other characteristic features of the invention are set forth in the appended claims.

Although the invention is illustrated and described herein as embodied in a convertible pickup truck, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE PREFERRED EMBODIMENTS

Figure 1:
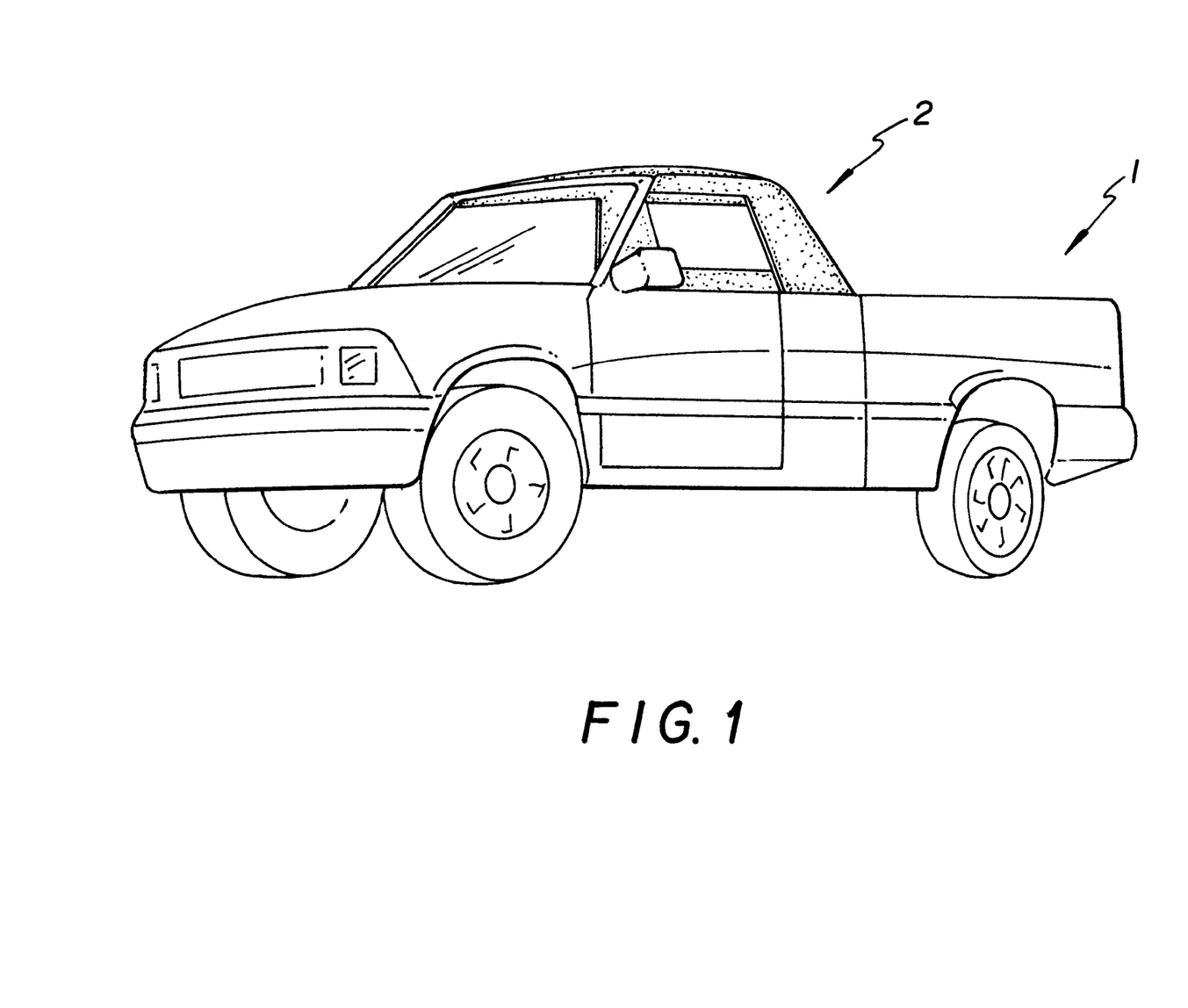
FIG. 1 is a diagrammatic, perspective view of an extended cab convertible pickup truck with a soft top in a raised position according to the invention.

Referring now to the figures of the drawings in detail and first, particularly, to FIG. 1 thereof, there is shown a roofless extended cab pickup truck 1 with a soft top 2 in a raised position.

Figure 2:
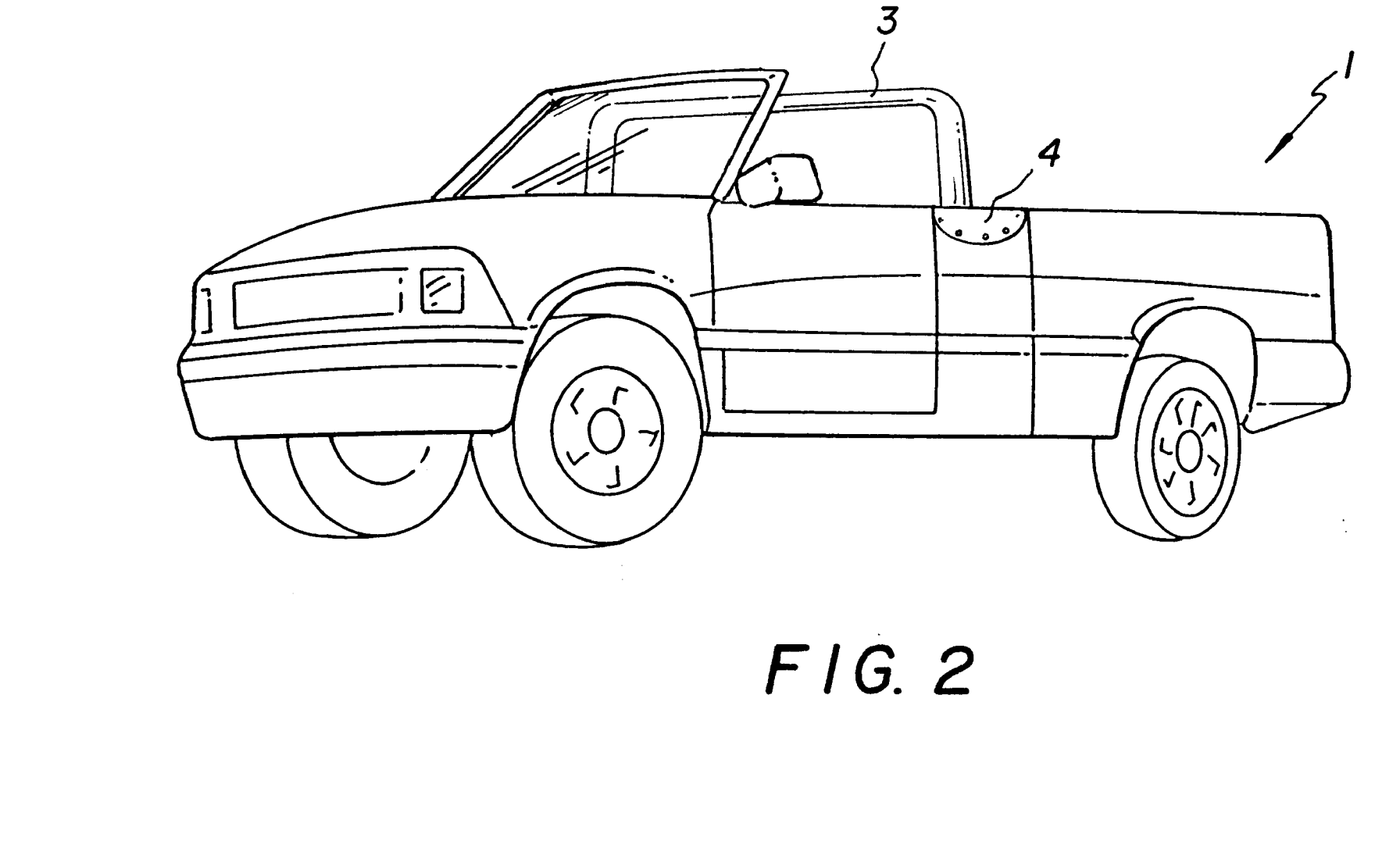
FIG. 2 is a perspective view of the convertible pickup truck with the soft top in a lowered position.

FIG. 2 shows the soft top 2 in a lowered position (not visible in FIG. 2) exposing a safety bar 3 and a side edge of a U-shaped, frame covering piece 4. The safety bar 3 is secured to the truck 1 by welding it to the floor, the frame and to the side walls of the truck 1. A truck's roof provides structural integrity to the truck 1. When the roof is removed, the truck 1 loses the structural integrity provided by the roof. The safety bar 3 replaces the necessary structural integrity that the roof had previously provided.

Figure 3:
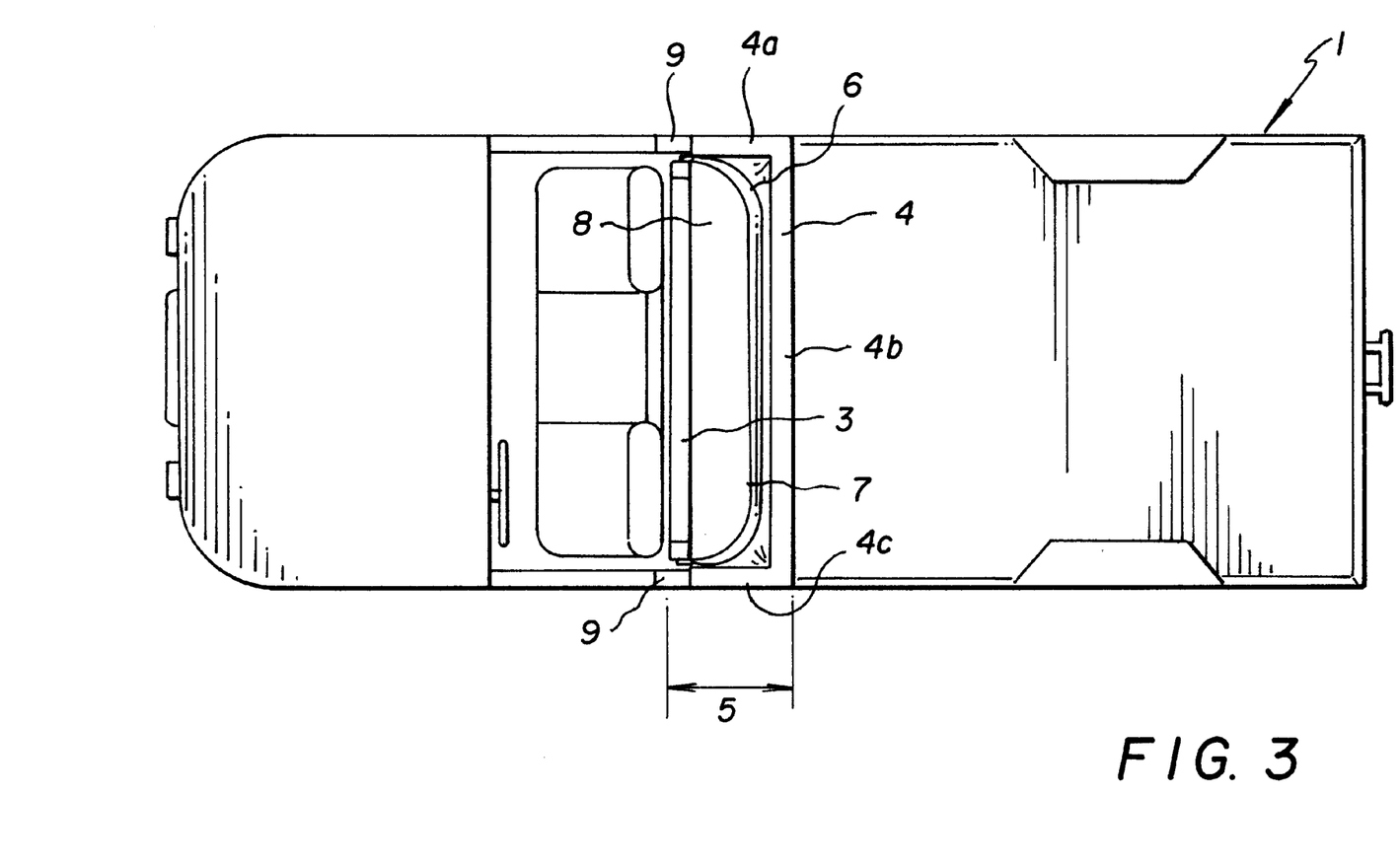
FIG. 3 is a top plan view of the soft top in the lowered position.

FIG. 3 shows the U-shaped piece 4 (4a, 4b & 4c) framing out a rear cab area 5 of the extended cab pickup truck 1 with the truck's roof removed. The U-shaped piece 4 covers those areas of the cab exposed by the removal of the truck's roof. The U-shaped piece 4 is composed of two wing sections 4a, 4c and a middle section 4b. The U-shaped piece 4 can be made from various materials including fiberglass, metal, plastic and composites. A set of cover plates 9 are also used to cover an exposed area of the door/rear cab area 5 exposed when the truck's roof is removed. The cover plates 9 are metallic or fiberglass plates that cover holes created in the door/rear cab area when the roof is removed.

Figure 4:
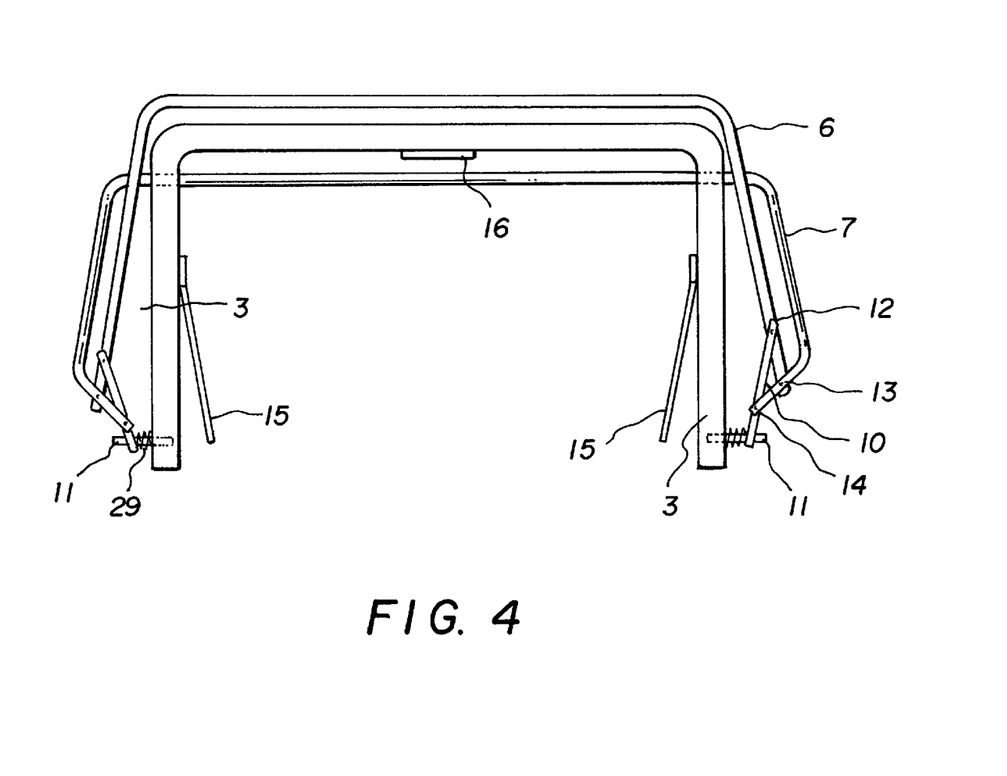
FIG. 4 is a front elevational view of a framework of the soft top.

The soft top 2 has a framework which includes a front bow 6 and a rear bow 7 as shown in FIG. 4. The bows 6,7 are generally tubular in shape and recline into the area of the rear cab 5 of the pickup truck 1 The soft top 2 can be stored as deeply towards the floor area in the area of the rear cab 5 as desired. The soft top 2 can also rest on the top of a storage cabinet 8 (FIG. 3) instead of the floor of the cab. The storage cabinet 8 can be a tool box or other built in storage structure in order to efficiently utilize the space in the rear cab area such that the rear cab area can be used for more than just storing the soft top 2.

FIG. 4 shows a set of seat belts 15 disposed on and extending from the safety bar 3. In addition, the safety bar 3 also houses a dome light 16.

A pin 11 having a spring 29 secures a brace 10 to the safety bar 3 as shown in FIG. 4. The front bow 6 is secured to the brace 10 by a fastener 12 such as a loop, and to the rear bow 7 with a fastener 13 such as a bolt. The rear bow 7 is further secured to the brace 10 by another fastener 14 such as a nut and bolt. The brace 10 pivots around the pin 11 in order to allow the soft top 2 to be raised or lowered. The loop 12 guides the movement of the front bow 6 and allows for some play in the movement of the front bow 6 so as to provide a little flexibility in the positioning of the soft top 2. Due to the configuration of the bows 6,7, the brace 10 and the mounting positioning of the pin 11, the bows 6,7 angle slightly towards the center of the truck 1 so that the bows 6,7 pass behind the safety bar 3 and away from the U-shaped piece 4 such that the soft top 2 fits within the confines of the area of the rear cab 5 when the soft top 2 is lowered.

Figure 5:
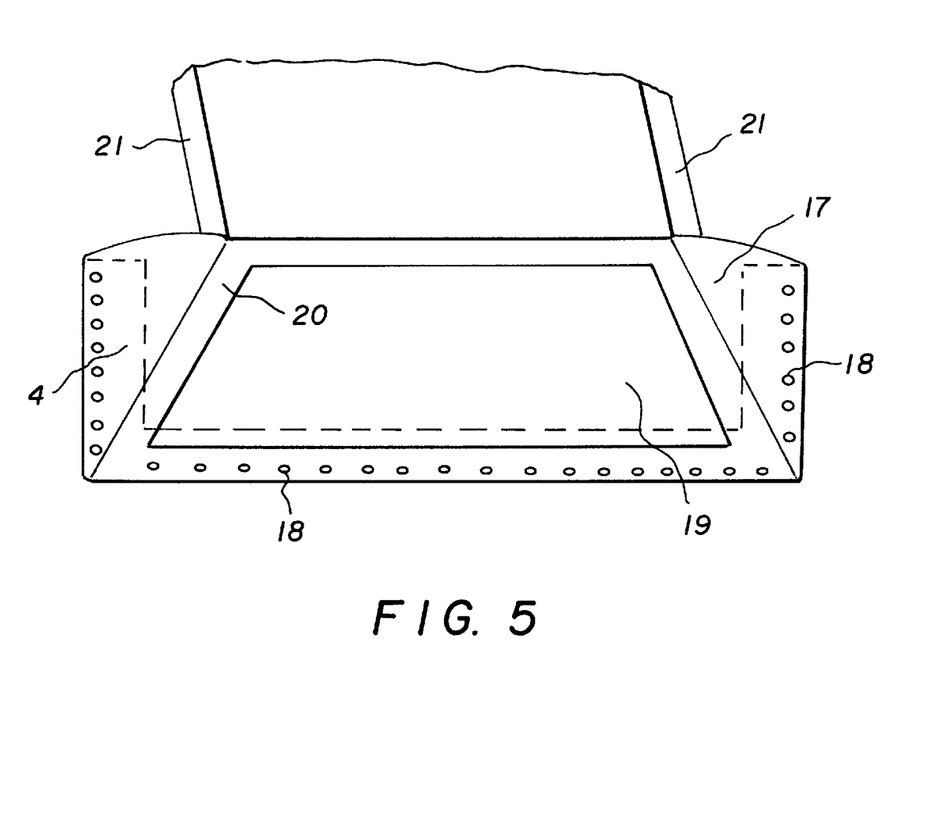
FIG. 5 is a rear, fragmentary, perspective view of the soft top.

FIG. 5 shows a top, rear view of a soft cover 17. The cover 17 can be made from canvas, plastic, leather, rubber and other durable and flexible materials. The rear of the cover 17 is secured to the U-shaped piece 4 with a plurality of snaps 18. A window 19 resides in the middle of the back area 20 of the cover 17. The cover 17 also has side flaps 21 that extend vertically down from the cover 17 and provide a tight seal around the side-door windows of the pickup truck.

Figure 6:
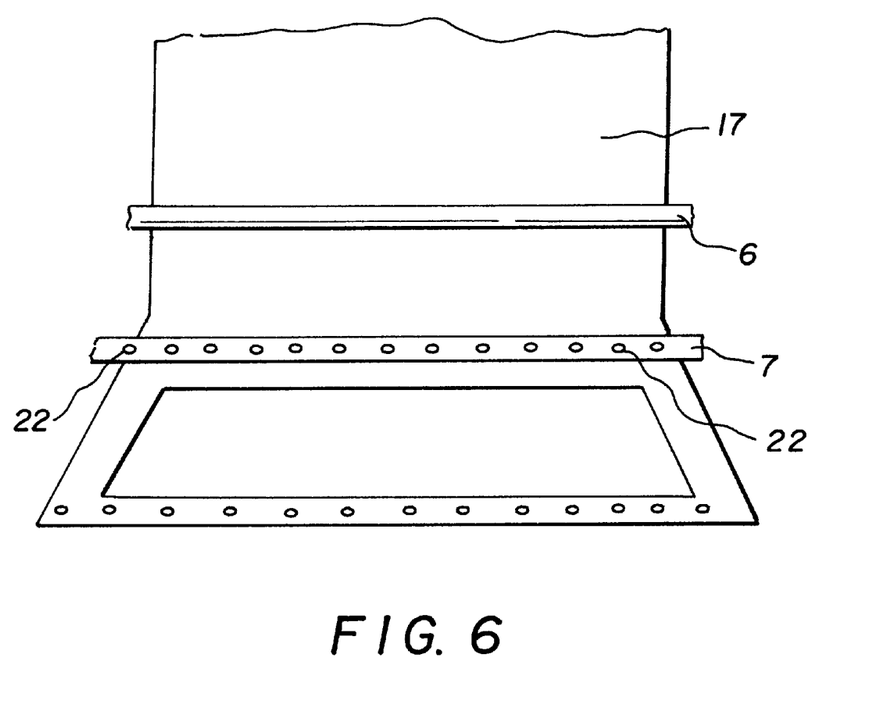
FIG. 6 is a fragmentary, bottom plan view of the soft top.

FIG. 6 shows the inside of the cover 17 being attached to the rear bow 7 with snaps 22. Other securing methods such as Velcro strips or sewing the cover around the rear bow 7 is also possible. The cover 17 is also shown to be sewn around the front bow 6. The cover 17 could also be secured to the front bow 6 by snaps or Velcro strips.

Figure 7:
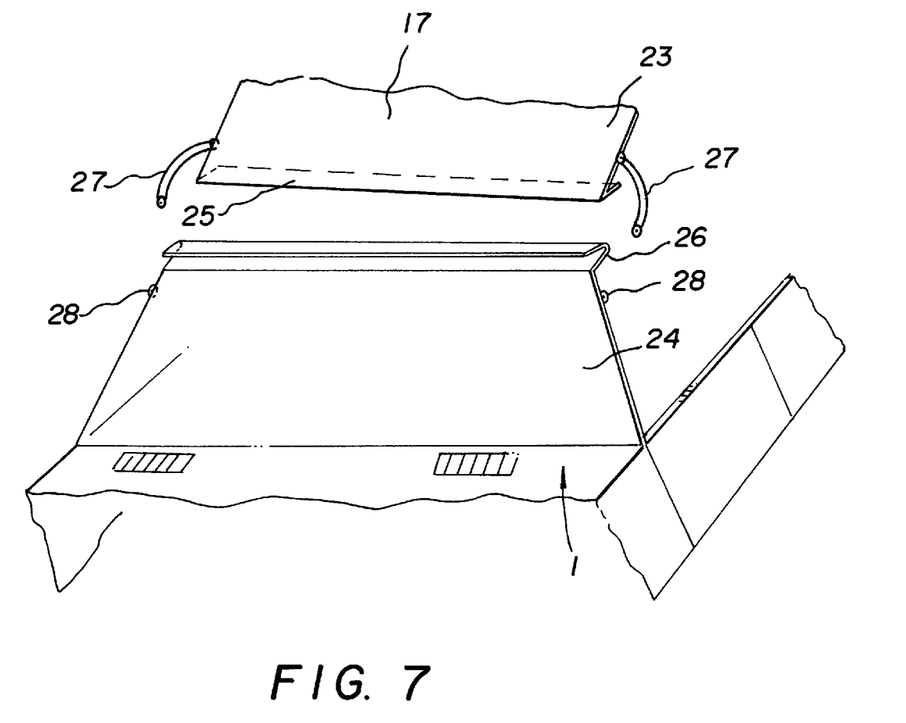
FIG. 7 is a fragmentary, perspective view of the soft top's connection mechanism to a windshield.

FIG. 7 shows how the front 23 of the cover 17 is secured to a top of a windshield assembly 24. The front area 23 of the cover 17 has a male connecting strip 25 which engages a female connecting strip 26 which is disposed on the top of the windshield assembly 24. The cover 17 is further secured to the windshield assembly 24 by a set of straps 27 which secure to snaps 28 disposed on the sides of the windshield assembly 24. Other latching mechanisms, such as hand operated latches or locks can be substituted for the male and female connecting strips.

Figure 8:
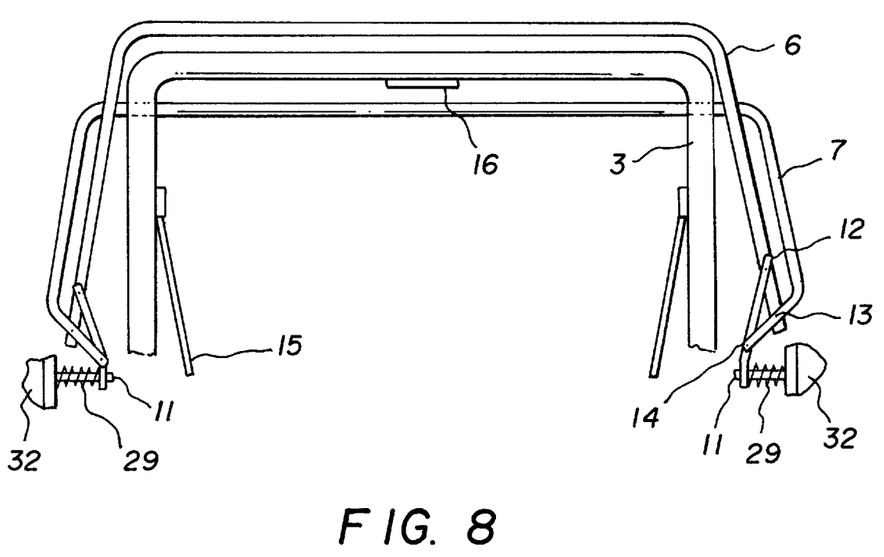
FIG. 8 is a front elevational view of the framework of the soft top secured to a side wall of the truck.

FIG. 8 shows an alternative method of securing the framework. In this alternative, the framework is secured to the side walls 32 of the pickup truck 1 by the pin 11 (instead of to the safety bar). The framework still rotates about the pin 11 for raising and lowering the convertible top 2.

Figure 9:
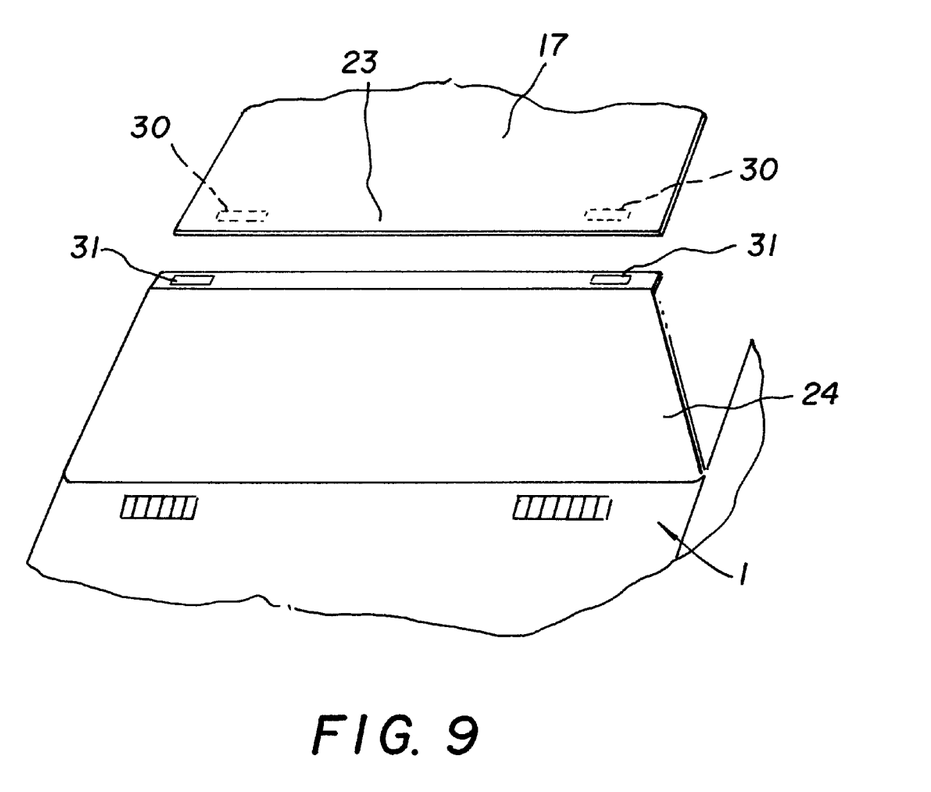
FIG. 9 is a fragmentary, perspective view of a latching mechanism.

FIG. 9 shows an alternative method of securing the cover 17 to the windshield assembly. A set of latches 30 are secured on the inside of the front portion 23 of the cover 17. The latches 30 secure to a latch receiver 31 which in turned is connected to the windshield assembly.

Although it is not illustrated in the figures, it is envisioned that the soft top 2 or for that matter any roof structure could incorporate a motor and control device to automate the raising and lowering of the soft top 2.

Figure 10:
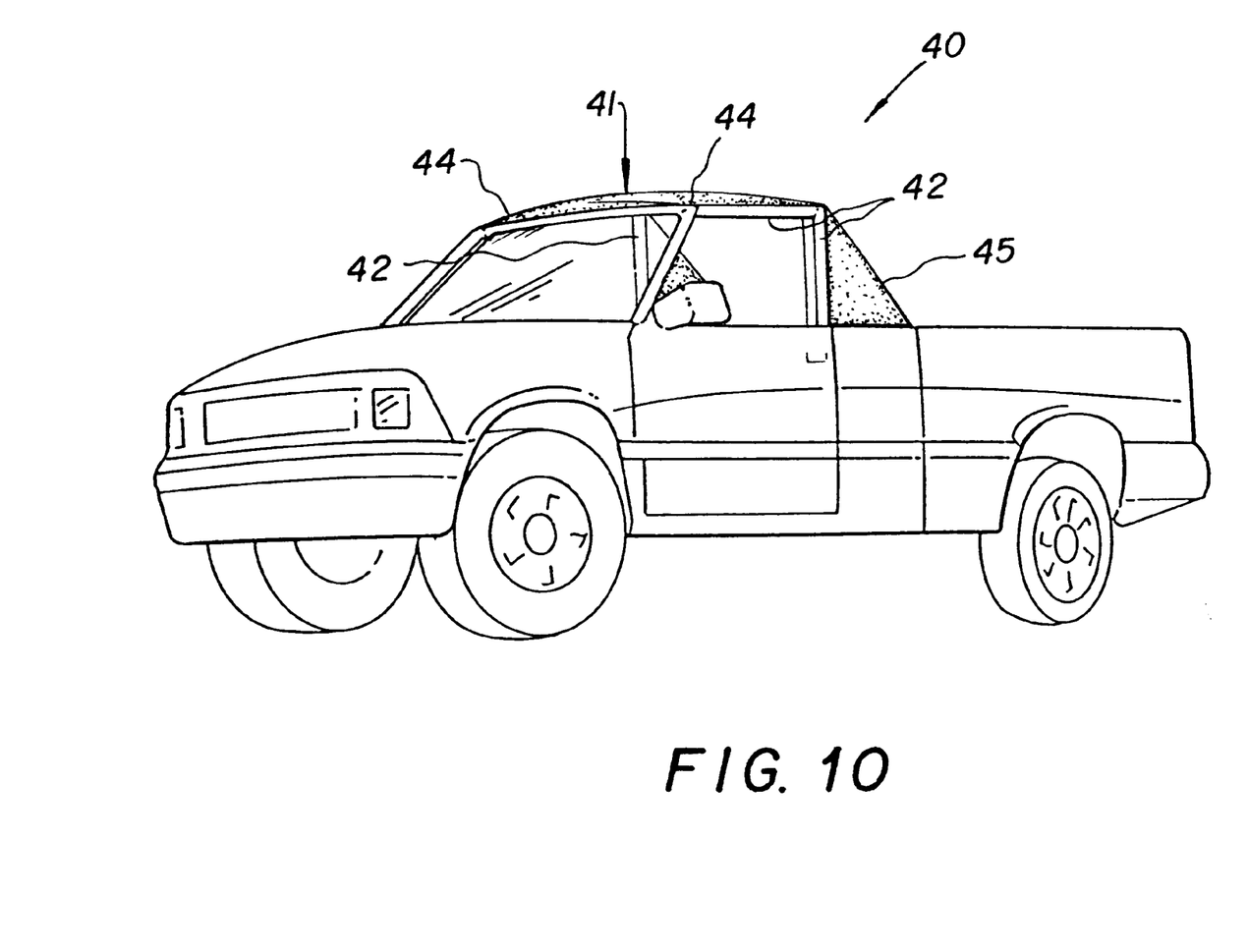
FIG. 10 is a perspective view of a second embodiment of the convertible pickup formed with a hard top.

FIG. 10 shows a second embodiment of the invention. The invention is shown with a hard top configuration 40. In the hard top configuration 40, a portion of the existing roof 41 of the pickup truck is still utilized. The roof structure 41 is cut in a horizontal direction across the width of the roof a few inches from the windshield. The width of the roof is again cut right behind the passenger compartment. The cut edges of the roof are then fitted with sleeves 44 to fit and seal the cut portions of the roof. The rear of the cut roof 41 is supported and attached to a hinged safety bar 42. The hinge of the safety bar 42 having a built-in lock which must be released before the hinge can function. A rear cover 45 containing a window is also secured to the top of safety bar 42.

Figure 11:
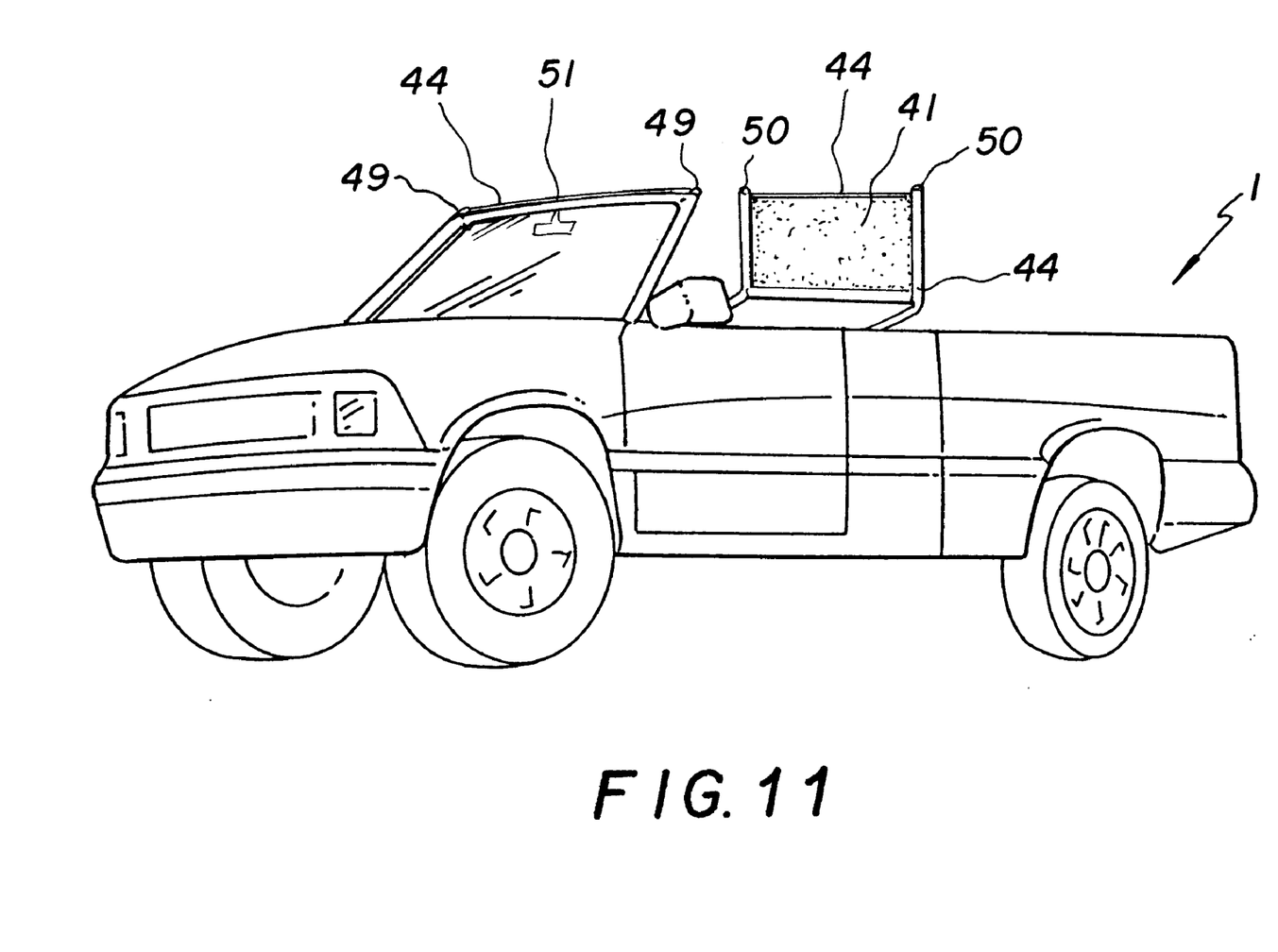
FIG. 11 is a perspective view of a partially retracted hard top.
Figure 12:
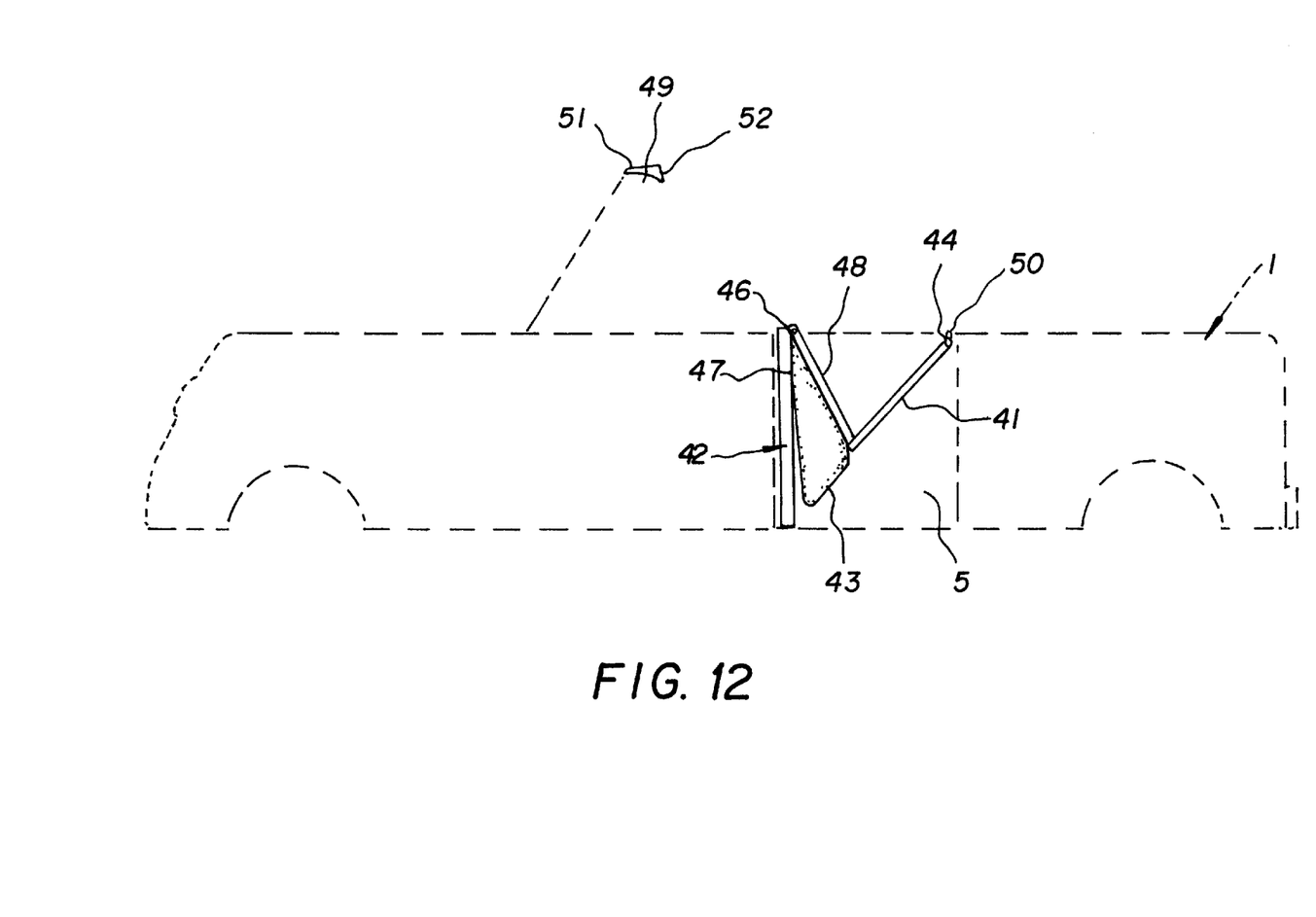
FIG. 12 is a side view of the hard top in a fully retracted position view shown in the extended cab area of the outlined pickup truck.

As seen in FIGS. 11 and 12, the safety bar 42 has an upper portion 48, a locking hinge 46 and a lower portion 47. The roof 41 has latching devices 50 attached to both sides of the sleeve member 44. The latching devices 50 engage the latch receivers 49 positioned on the front roof portion 51. The latching devices 50 release the roof 41 and allows the safety bar 42 to be pivoted about the hinge 46. The roof 41 is pivoted back until it resides within the confines of the extra cab area 5 of the pickup truck 1. The front roof portion 51 also also has a sleeve member 52 attached to the front roof portion 51 to cover over the recently cut roof line.

I claim:

1. In combination with a roofless pickup truck having a rear extended cab area and a windshield assembly, a roof structure, comprising:

a safety bar secured to the truck;

a plurality of fasteners;

a framework secured to said safety bar by said fasteners for pivoting around said fasteners between a raised and a lowered position; and a cover secured to said framework and fastened to the windshield assembly in the raised position of said framework and residing within the rear extended cab area in the lowered position of said framework.

2. The roof structure according to claim 1, wherein said framework includes a brace fastened by said fastener, a front bow and a rear bow connected to said brace.

3. The roof structure according to claim 1, wherein said safety bar includes a set of seat belts.

4. The roof structure according to claim 1, wherein said safety bar includes a dome light.

5. The roof structure according to claim 1, including a U-shaped piece disposed in the rear extended cab area.

6. The roof structure according to claim 1, wherein said cover is fastened to said front bow and said rear bow.

7. The roof structure according to claim 1, wherein the windshield assembly has a female connecting strip, and said cover has a male connecting strip for engaging said female connecting strip.

8. The roof structure according to claim 1, wherein said windshield assembly has a set of snaps, and said cover has a set of straps for engaging said set of snaps.

9. The roof structure according to claim 1, wherein said cover has a plurality of snaps for securing said cover to said U-shaped-piece.

10. The roof structure according to claim 1, wherein said cover has a window disposed therein.

11. The roof structure according to claim 1, wherein said fastener is a pin with a spring.

12. The roof structure according to claim 1, wherein said cover is made from a material selected from the group consisting of canvas, plastic, rubber and leather.

13. The roof structure according to claim 1, including a set of latches connected to said cover for engaging the windshield assembly.

14. In combination with a pickup truck having a rear extended cab area and a windshield assembly, a roof structure, comprising:

a hinged, two-piece safety bar secured to the truck;

a roof structure formed from the existing pickup truck's roof, said roof having a front piece secured to a windshield and a rear piece secured to said hinged safety bar;

a rear cover having a window secured to said safety bar;

latching devices being secured to said rear roof piece;

latch receiving devices secured to said front roof piece for engaging said latching devices; and said rear roof piece being pivoted about said hinge of said safety bar for raising and lowering said rear roof piece and said rear roof piece residing within the confines of the rear extended cab area in a lowered position of said rear roof piece.

\* \* \* \* \*